(12) United States Patent
Cloutier

(10) Patent No.: US 10,258,192 B1
(45) Date of Patent: Apr. 16, 2019

(54) COOKING UTENSIL

(71) Applicant: Magellan Home Goods, Ltd., Blaine, WA (US)

(72) Inventor: Andre Dean Cloutier, Blaine, WA (US)

(73) Assignee: Magellan Home Goods, Ltd., Blaine, WA (US)

( * ) Notice: Subject to any disclaimer, the term of this patent is extended or adjusted under 35 U.S.C. 154(b) by 208 days.

(21) Appl. No.: 15/295,692

(22) Filed: Oct. 17, 2016

(51) Int. Cl.
*A47J 37/04* (2006.01)
*A47J 36/16* (2006.01)
*A47J 27/00* (2006.01)
*A47J 27/04* (2006.01)

(52) U.S. Cl.
CPC ........... *A47J 36/16* (2013.01); *A47J 27/002* (2013.01); *A47J 2027/043* (2013.01)

(58) Field of Classification Search
None
See application file for complete search history.

(56) References Cited

U.S. PATENT DOCUMENTS

| | | | | |
|---|---|---|---|---|
| 5,301,602 A * | 4/1994 | Ryczek | ................... | A47J 43/18 99/345 |
| 5,575,198 A * | 11/1996 | Lowery | ................... | A47J 43/18 99/426 |
| 6,125,739 A * | 10/2000 | Jernigan | ................ | A47J 43/18 99/345 |
| 6,196,120 B1 * | 3/2001 | Reames | ................... | A47J 27/04 126/369 |
| 6,272,976 B1 * | 8/2001 | Berryman | ............... | A47J 27/04 99/340 |
| 6,427,582 B1 * | 8/2002 | Measom | ................. | A47J 27/00 99/342 |
| 6,467,399 B1 * | 10/2002 | Boutte | .................... | A47J 43/18 99/347 |
| 6,487,964 B2 * | 12/2002 | Snoke | ..................... | A47J 37/01 99/345 |
| 6,502,501 B1 * | 1/2003 | Simon | ..................... | A47J 27/04 99/345 |
| 6,536,603 B1 * | 3/2003 | Sollo | ....................... | A47J 36/08 210/464 |
| 6,840,159 B1 * | 1/2005 | Li | ........................... | A47J 27/05 99/337 |

(Continued)

*Primary Examiner* — Ibrahime A Abraham
*Assistant Examiner* — Gyounghyun Bae
(74) *Attorney, Agent, or Firm* — Schacht Law Office, Inc.; Dwayne Rogge

(57) ABSTRACT

A cooking utensil is disclosed herein, in one example comprising: a cooking pan having a base panel with a perimeter sidewall extending thereabove around the circumference thereof so as to contain a volume of fluid in the cooking pan; a steamer insert pan is removably fitted within the cooking pan above the base panel. The steamer insert plate optionally having a surface defining a central void there through with a steamer dome attached to the steamer insert pan overlying the central void and extending vertically upwards therefrom. The steamer dome configure to extend into a food item to be cooked with a substantially non-permeable top cap so as to direct vapors from fluids heated within the cooking pan through the central void of the steamer insert plate and laterally through the side wall into the food item to be cooked.

8 Claims, 4 Drawing Sheets

(56) References Cited

U.S. PATENT DOCUMENTS

| | | | |
|---|---|---|---|
| 6,941,857 B2 * | 9/2005 | McLemore | A47J 37/1209 99/403 |
| 7,481,154 B2 * | 1/2009 | Murat | A47J 27/08 220/314 |
| 8,978,547 B2 * | 3/2015 | Salvino | A47J 27/05 220/573.3 |
| D810,497 S * | 2/2018 | Costa Llonch | D7/359 |

* cited by examiner

COOKING UTENSIL

BACKGROUND OF THE DISCLOSURE

Field of the Disclosure

This disclosure relates to the field of cooking utensils and, more particularly, relates to a cooking utensil for holding a selected food item, particularly poultry, to facilitate the roasting, steaming, and flavoring of the fowl with the vapors from heated fluids including fluids from the poultry as the selected fowl is cooked.

BRIEF SUMMARY OF THE DISCLOSURE

A cooking utensil is disclosed herein, in one example comprising: a cooking pan having a base panel with a perimeter sidewall extending thereabove around the circumference thereof so as to contain a volume of fluid in the cooking pan; a steamer insert pan removably fitted within the cooking pan above the base panel. In one example the steamer insert pan comprising a steamer insert plate with an outer edge in contact with the perimeter sidewall of the cooking pan forming a seal thereto. The steamer insert plate optionally having a surface defining a central void there through. Also disclosed is a steamer dome attached to the steamer insert pan overlying the central void and extending vertically upwards therefrom, the steamer dome configure to vertically upwards into a food item to be cooked. The steamer dome of one example having a laterally permeable perimeter wall extending vertically upwards from the steamer insert plate to a substantially non-permeable top cap so as to direct vapors from fluids heated within the cooking pan through the central void of the steamer insert plate and laterally through the side wall into the food item to be cooked.

The cooking utensil as recited herein may be arranged wherein the steamer insert plate comprises at least one surface defining a fluid drain hole radially outward of the central void and extending vertically through the steamer insert plate.

The cooking utensil as recited above may be arranged wherein the portion of the steamer insert plate adjacent at least one fluid drain hole is at a lowermost portion of the steamer insert plate.

The cooking utensil may be arranged wherein the top cap portion of the steamer dome is non-porous.

The cooking utensil may be arranged wherein the steamer insert plate comprises sidewalls extending vertically upwards from the steamer insert plate substantially to an upper edge of the perimeter sidewall.

The cooking utensil may be arranged wherein: the steamer insert comprises an alignment surface surrounding the central void thereof; wherein the alignment surface engages the steamer dome and maintains the steamer dome in horizontal alignment above the ventral void.

The cooking utensil may be arranged wherein the steamer insert pan comprises a vertically extending alignment protrusion which is friction fit to an inner surface of the steamer dome to hold the steamer dome in position.

DETAILED DESCRIPTION OF THE DISCLOSURE

Figure 1:
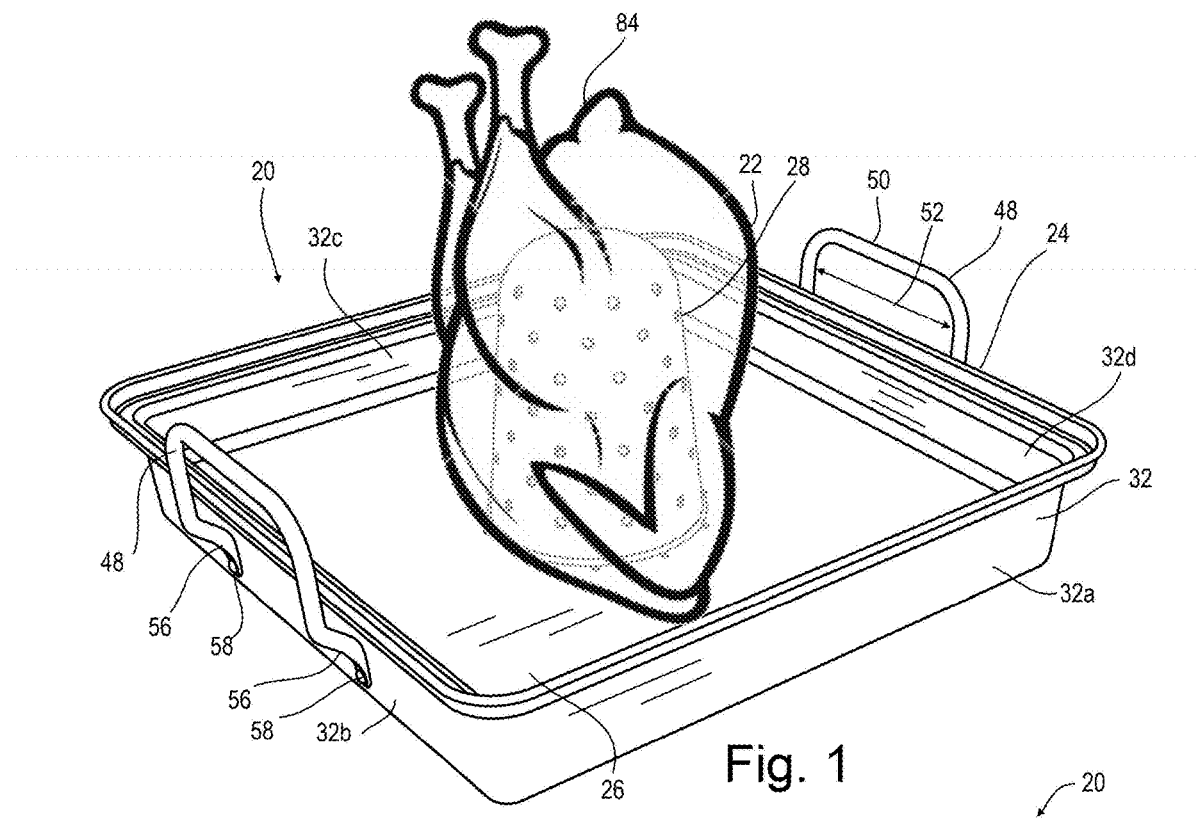
FIG. 1 is a top/front isometric view of one example of a cooking utensil as disclosed herein, assembled and ready for operation.
Figure 2:
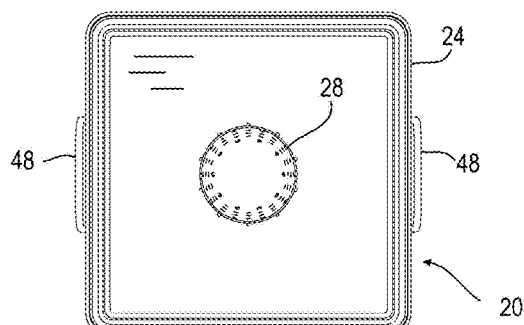
FIG. 2 is a top view of the cooking utensil of FIG. 1.
Figure 3:
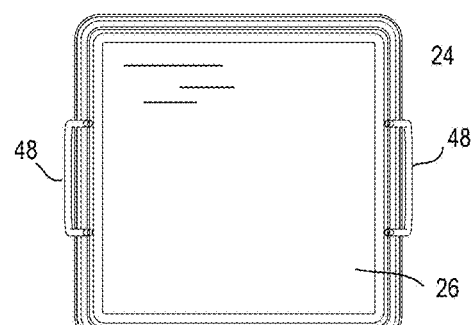
FIG. 3 is a bottom view of the cooking utensil of FIG. 1.
Figure 4:
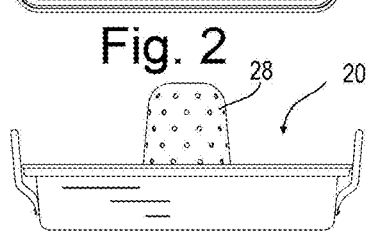
FIG. 4 is a front view of the cooking utensil of FIG. 1 with the opposing view being a mirror image thereof.
Figure 5:
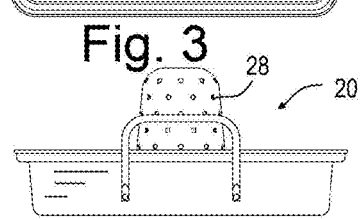
FIG. 5 is a side view of the cooking utensil of FIG. 1 with the opposing view being a mirror image thereof.
Figure 6:
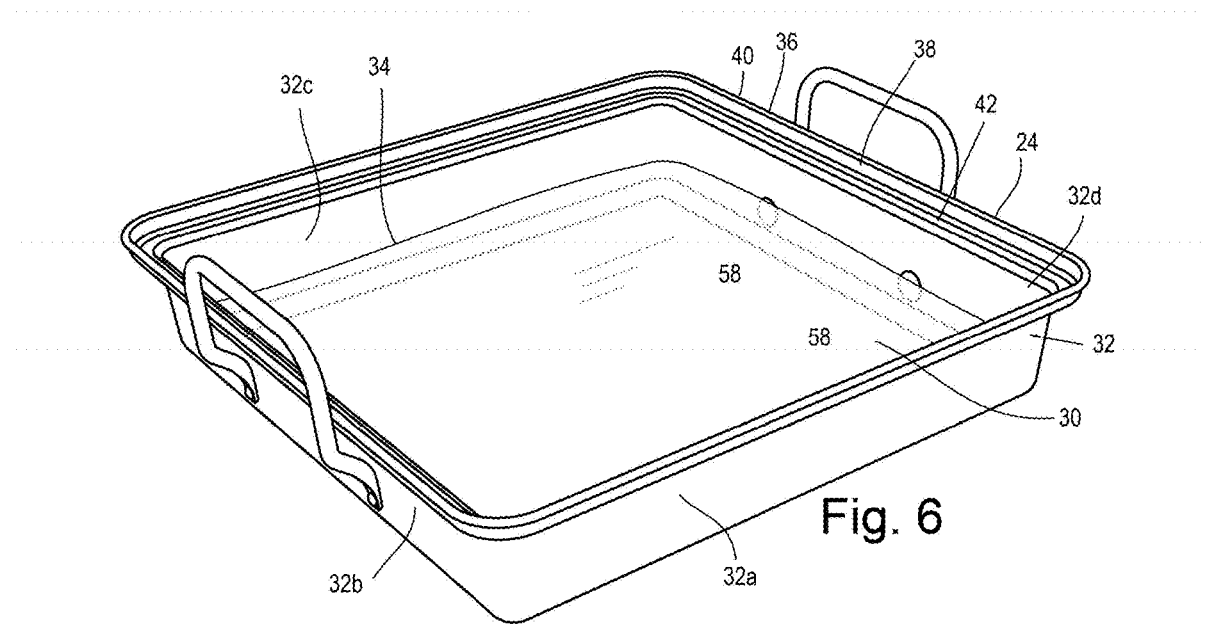
FIG. 6 is a top/front isometric view of the cooking utensil of FIG. 1 with components removed to show the underlying structure.
Figures 7, 8:
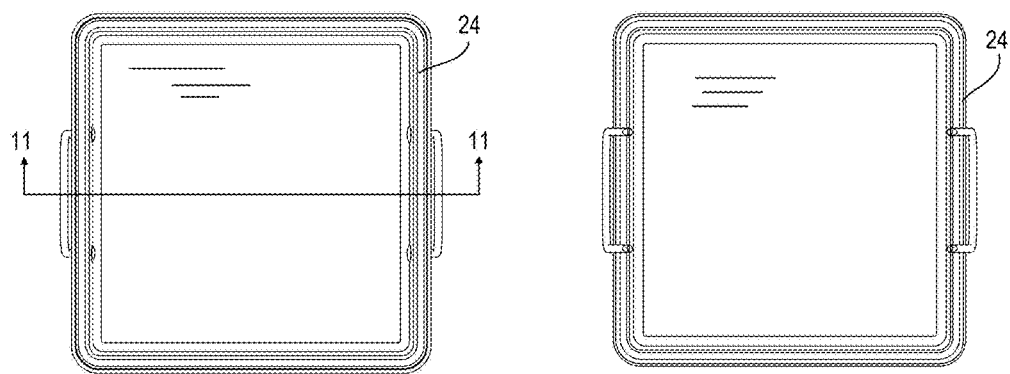
FIG. 7 is a top view of the component(s) shown in FIG. 6.
FIG. 8 is a bottom view of the component(s) shown in FIG. 6.
Figure 9:
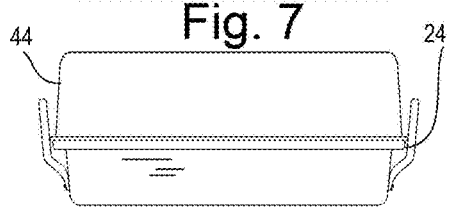
FIG. 9 is a front view of the component(s) shown in FIG. 6 with the opposing view being a mirror image thereof.
Figure 10:
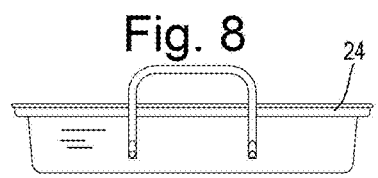
FIG. 10 is a side view of the component(s) shown in FIG. 6 with the opposing view being a mirror image thereof.
Figure 11:
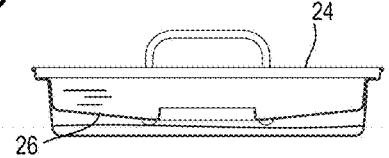
FIG. 11 is a side cutaway view of the component(s) shown in FIG. 6 taken along line 6-6 of FIG. 7.
Figure 12:
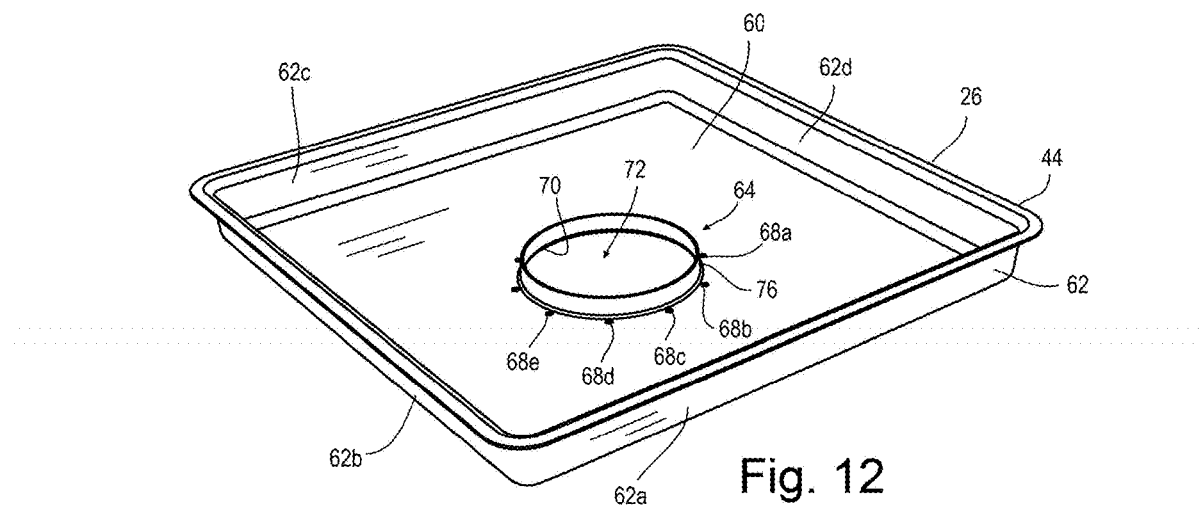
FIG. 12 is a top/front isometric view of the cooking utensil of FIG. 1 with components removed to show the underlying structure.
Figure 13:
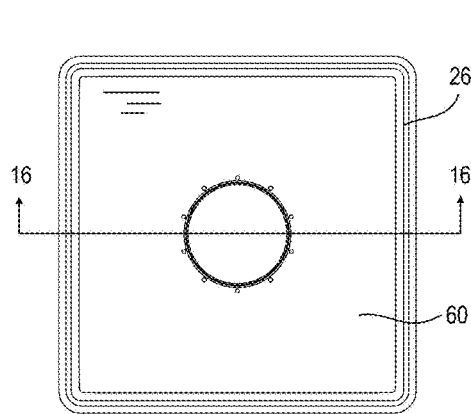
FIG. 13 is a top view of the component(s) shown in FIG. 12.
Figure 14:
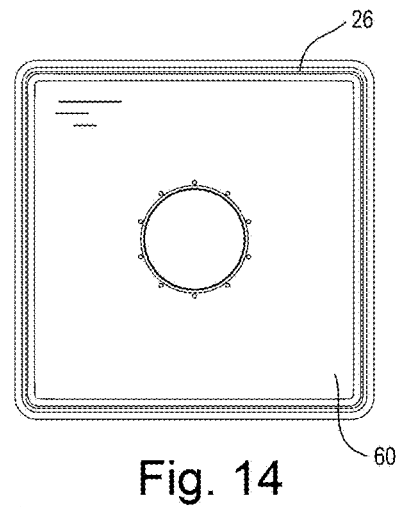
FIG. 14 is a bottom view of the component(s) shown in FIG. 12.

Disclosed herein is a cooking utensil 20 as shown by way of example in FIG. 1 for use in cooking of food items. In particular, the cooking utensil 20 is particularly useful for the cooking of poultry such as chicken, turkey, game hens, duck, goose, etc.

Looking to FIG. 1 is shown one example of the cooking utensil 20 fully assembled and with one example of a food item 22 shown ready to be cooked. The cooking utensil 20 of this example comprises several components which may be separated without tools and without damage for ease in cleaning, shipping, and storage. In particular, this example shows the cooking utensil 20 comprising several sub-components including: a cooking pan 24, a steamer insert pan 26 removably fitted into the cooking pan 24, and a steamer dome 28. The steamer dome 28 generally attached to the steamer insert pan 26 and projecting vertically thereabove. The cooking pan component 24 is shown in more detail in FIGS. 6-11, and will be described in more detail below. Likewise, one example of the steamer insert pan 26 is shown in FIGS. 12-16, and will be described in more detail below.

Similarly, one example of the steamer dome 28 is shown in FIGS. 17-21 and will also be described in more detail below.

In this example, the cooking pan 24 comprises a base panel 30 with a perimeter sidewall 32 formed in this example of front wall 32a, end wall 32b, rear wall 32c and end wall 32d which envelope the base panel 30 and allow the cooking pan to retain fluids therein. The cooking pan 24 thus arranged will contain not only any solid or fluid residuals from the food item 22 but may also contain fluid 34 to be heated which is utilized in the cooking process. For example, it may be desired to place a small volume of water into the cooking pan 24 prior to cooking of the food item 22 such that as the cooking apparatus 20 and food item 22 are heated, the fluid 34 which may be water, stock juices, pan juices, or other liquids heat and turn into vapor (steam) which are then utilized in the cooking process as will be described below in more detail.

In the example shown in FIG. 1-5 each sidewalls 32 has at its upper edge 36 an outward protrusion 38 extending horizontally away from the center or inner portion of the cooking pan 24. This protrusion 38 extends radially outward to a vertically oriented lip 40 extending above the protrusion 38. The protrusion 38 and lip 40 forms a shelf 42 which may be utilized to rest an outer edge 44 of the steamer insert pan 26 and/or domed lid 44. In one example, this arrangement is provided such that the lowermost surface 46 of the steamer insert pan 26 does not directly contact the base panel 30 of the cooking pan 24.

In one example, the domed lid 44 well-known in the art as a lowermost edge that rests upon the shelf 42 and extends above the cooking pan 24 and also extends above the food item 22 in use. In many applications, such a domed lid will not be utilized. Where utilized, such a domed lid is used to keep heat, vapors, fluids, etc. within the cooking utensil 20 and to keep contaminates out.

To ease in transporting the cooking utensil 20 with food item 22 and fluid 34 from a food preparation area to a heat source such as a stovetop, BBQ grill, fire, or oven, the user grasping handles 48 may be provided on opposing sides of the cooking utensil 20. In the example shown, the user grasping handles 48 comprise a cross member 50 which is easily grasped by the hand of a user with their fingers passing through an opening having a width 52 at least as wide as a normal user's hand generally on the order of 5 inches±2 inches.

In the example shown, the lower ends 56 of the user grasping handles 48 may be attached to the end walls 32 of the cooking pan 24 by way of fasteners 58 such as rivets, screws, bolts, etc. or may be otherwise attached such as by welding, brazing, adhesives, etc.

The steamer insert pan 26 shown in FIG. 1 is shown in more detail in FIGS. 12-16 with the steamer dome 28 removed to show the underlying components of the steamer insert pan 26. In particular it can be seen that the steamer insert pan 26 of this example comprises a steamer insert plate 60 having substantially the same shape and dimensions as the base panel 30 of the cooking pan 24. In examples wherein the sidewalls 32 of the cooking pan 24 do not taper outward toward the upper edge, the steamer insert plate 60 will be of slightly smaller dimensions so as to fit within the sidewalls 32 of the cooking pan 24. In this example, the steamer insert plate 60 also comprises a perimeter sidewall 62 similar to the sidewalls 32 of the cooking pan 24. The sidewalls 62 of the steamer plate including a front wall 62a, sidewall 62b, rear wall 62c, and sidewall 62d. The combination of the steamer insert plate 60 and sidewalls number 62 function together to contain or direct fluids in a similar manner to that described above. In the example shown, the upper portion of the sidewalls 62 has an outwardly protruding outer edge 44 which as previously described rests upon the shelf 42 of the cooking pan 24. This maintains the lowermost surface 46 of the steamer insert pan 26 vertically above the base panel 30 of the cooking pan 24.

Figure 15:
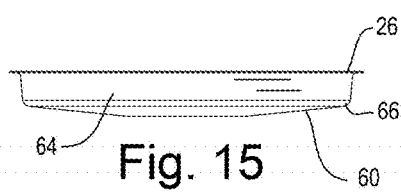
FIG. 15 is a side or front view of the component(s) shown in FIG. 12 with the opposing view(s) being a mirror image thereof.
Figure 16:
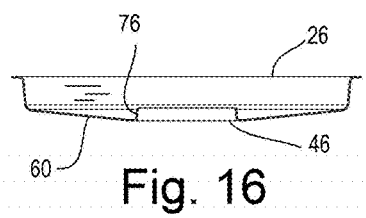
FIG. 16 is a side or front cutaway view of the component(s) shown in FIG. 12.
Figure 17:
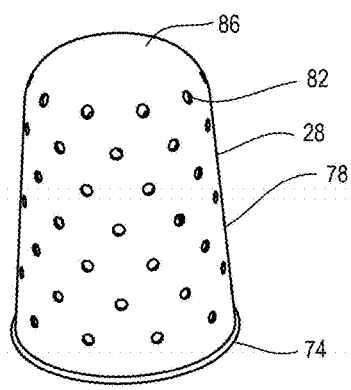
FIG. 17 is a top/front isometric view of the cooking utensil of FIG. 1 with components removed to show the remaining structure.
Figure 18:
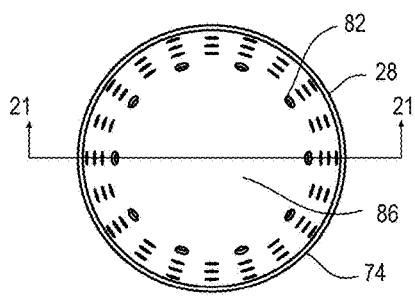
FIG. 18 is a top view of the component(s) shown in FIG. 17.
Figure 19:
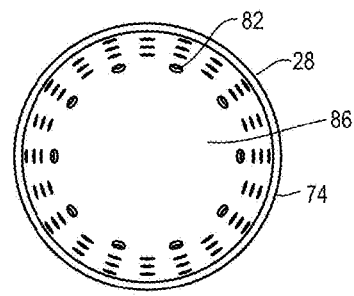
FIG. 19 is a bottom view of the component(s) shown in FIG. 17.
Figure 20:
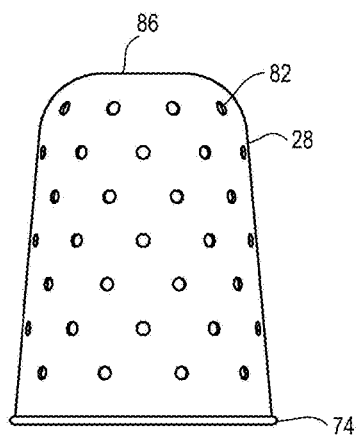
FIG. 20 is a front or side view of the component(s) shown in FIG. 17 with the opposing view(s) being a mirror image thereof.

Looking to FIG. 15 is shown a front or side view of the steamer insert pan 26 in an example wherein the steamer insert plate 60 is not planar, as the center portion 64 is vertically below the outer portion at the transition 66 from the steamer insert plate 62 the sidewalls 62. This arrangement directing any fluids entering the steamer insert pan 26 toward the center portion 64. In the example shown, the center portion 64 comprises a plurality of surfaces defining fluid drain holes 68 through which any fluids entering the steamer insert pan 26 will drain through into the cooking pan 24 where they are heated and the vapors therefrom rise through the steamer dome 28 to aid in cooking of the food item 22.

In the example shown, the steamer insert pan 26 comprises a surface 70 defining a void 70 through the steamer insert plate 60. The steamer dome 28 in one example is configured to rest above this void 72 such that the vapors rising off of the heated fluids 34 travel through the void 72 into the interior of the steamer dome 28 and outward to the food item 22.

Figure 21:
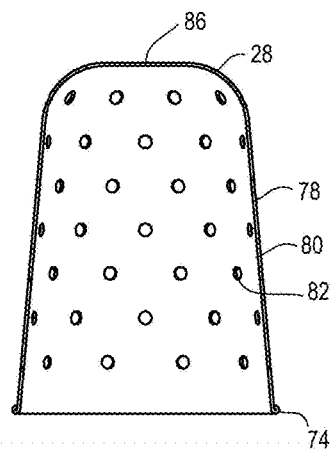
FIG. 21 is a side cutaway view of the component(s) shown in FIG. 17.

The steamer insert dome 28 of the example shown in the drawings has a vertically lowermost edge 74 which as can be seen in the cutaway view of FIG. 21 may be a rolled edge for safety, rigidity, and to aid in assembly upon the steamer insert pan 26. In one example, as can be clearly seen in FIG. 12, the surface 70 forming the void 72 includes a vertically extending alignment protrusion 76 although this could be reversed such that the steamer dome 28 engages a recess in the steamer insert pan 26. In this example, as the lowermost edge 74 of the steamer dome 28 fits exterior of the alignment protrusion 76 in a friction engagement to maintain the steamer dome 28 in the correct horizontal alignment. In one example, the steamer dome 28 may be inserted into the food item 22 prior to assembly upon the steamer insert pan 26 to aid in assembly of these components. For example, the cooking pan 24 with steamer insert pan 26 installed therein with the fluid 34 previously in place may be inserted into an oven once combined. Thereafter, the food item 22 and steamer dome 28 may be inserted, thus reducing the weight of any individual combination. While such as not required commonly for small food items, larger food items such as geese or turkeys may be aided by such component installation as the entire assembled weight need not be moved at the same time.

It can also be seen in this example that the steamer dome 28 comprises a perimeter wall 78. In example shown, the perimeter wall 78 is laterally permeable by way of a wall structure 80 with surfaces defining laterally extending vents 82 through the wall structure 80.

As the upper end 84 of many food items is open, it may be desired to configure the top cap 86 to be non-permeable. Thus, steam, vapors, hot gases, etc. from the fluid 34 heated in the cooking pan 24 will rise through convection upward through the opening 72 into the steamer dome 28 and laterally through the vents 82 into the food item 22. The combination of convection and/or radiant heat on the exterior surface of the food item 22 will more efficiently cook the food item 22.

Testing has shown that cook time is harder significantly enhanced by the efficiency provided by this combination of components. For example, placing a 5 pound chicken in a pan and placing this in a preheated oven at 425° cooking time to achieve a safe internal temperature for cooked chicken at 165° F. took one hour and 20 min. Cooking an equivalent 5 pound chicken with the cooking utensil 20 disclosed herein in a preheated oven at 425° took 24 min. to achieve the same safe internal temperature of the hundred and 65° F.

In one example, the area of the void 72 through the steamer insert plate 60 is greater than the aggregate area of the vents 82 through the steamer dome 28. This will result in constricted flow through the vents 82, a pressure differential, and increasing now velocity through the vents 82 resulting in jetting of the heated vapors into the food item 22. In one example, it may be desired to configure the cooking utensil 20 such that the aggregate area of the fluid drain holes 68 and void 72 through the steamer insert plate 60 is greater than the aggregate area of the vents 82 through the steamer dome 28.

The cooking utensil as recited herein may be arranged wherein the steamer insert plate comprises at least one surface defining a fluid drain hole radially outward of the central void and extending vertically through the steamer insert plate.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A cooking utensil comprising:
   a cooking pan having a base panel with a perimeter sidewall extending thereabove around the circumference thereof so as to contain a volume of fluid in the cooking pan;
   a steamer insert pan removably fitted within the cooking pan above the base panel;
   the steamer insert pan comprising a steamer insert plate with an outer edge in contact with the perimeter sidewall of the cooking pan forming a seal thereto;
   the steamer insert plate having a surface defining a central void therethrough, a vertically extending alignment protrusion;
   the surface defining a central void of the steamer insert pan vertically below the outer edge of the steamer insert pan;
   a steamer dome attached to the steamer insert pan overlying the central void and extending vertically upwards therefrom, the steamer dome configured to extend vertically upwards into a food item to be cooked;
   the steamer dome having a laterally permeable perimeter wall extending vertically upwards from the steamer insert plate to a substantially non-permeable top cap so as to direct vapors from fluids heated within the cooking pan through the central void of the steamer insert plate and laterally extending vents extending laterally through the side wall into the food item to be cooked;
   at least one surface defining a fluid drain hole radially outward of the central void and extending vertically through the steamer insert plate;
   wherein fluids on the steamer insert pan drain through the fluid drain hole into the cooking pan where they are heated and vapors therefrom rise though the steamer dome to aid in cooking of a food item; and
   wherein the lowermost edge of the steamer dome vertically overlaps the surface of the steamer insert plate defining the fluid drain hole exterior of the lowermost edge of the steamer dome.

2. The cooking utensil as recited in claim 1 wherein the portion of the steamer insert plate adjacent at least one fluid drain hole is at a lowermost portion of the steamer insert plate.

3. The cooking utensil as recited in claim 1 wherein the top cap portion of the steamer dome is non-porous.

4. The cooking utensil as recited in claim 1 wherein the steamer insert plate comprises sidewalls extending vertically upwards from the steamer insert plate substantially to an upper edge of the perimeter sidewall.

5. The cooking utensil as recited in claim 1 wherein:
   the steamer insert comprises an alignment surface surrounding the central void thereof;
   wherein the alignment surface engages the steamer dome and maintains the steamer dome in horizontal alignment above the ventral void.

6. The cooking utensil as recited in claim 1 wherein the steamer insert pan comprises a vertically extending alignment protrusion which is friction fit to an inner surface of the steamer dome to hold the steamer dome in position.

7. The cooking utensil as recited in claim 1 wherein the area of the central void through the steamer insert plate is greater than the aggregate area of the vents through the steamer dome.

8. The cooking utensil as recited in claim 7 wherein the aggregate area of the fluid drain holes and central void through the steamer insert plate is greater than the aggregate area of the vents through the steamer dome.

* * * * *